United States Patent
Roytman et al.

(10) Patent No.: US 9,525,754 B1
(45) Date of Patent: Dec. 20, 2016

(54) TASK-BASED APPROACH TO EXECUTION, MONITORING AND EXECUTION CONTROL OF ACTIONS

(71) Applicants: Evgeny Roytman, Sharon, MA (US); Matthew Troutman, Houston, TX (US)

(72) Inventors: Evgeny Roytman, Sharon, MA (US); Matthew Troutman, Houston, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 34 days.

(21) Appl. No.: 13/629,826

(22) Filed: Sep. 28, 2012

(51) Int. Cl.
*G06F 15/16* (2006.01)
*H04L 29/08* (2006.01)

(52) U.S. Cl.
CPC ................ *H04L 67/32* (2013.01)

(58) Field of Classification Search
CPC .... H04L 67/02; G06F 9/465; G06F 17/30887; G06F 17/3089; G06F 17/30876
USPC .......................................... 709/226; 714/226
See application file for complete search history.

(56) References Cited

U.S. PATENT DOCUMENTS

| | | | | |
|---|---|---|---|---|
| 2003/0103090 | A1* | 6/2003 | Kelley et al. ................. | 345/854 |
| 2008/0201338 | A1* | 8/2008 | Castro ................ | G06F 17/3056 |
| 2009/0006523 | A1* | 1/2009 | Kordun ............... | G06F 17/3089 |
| | | | | 709/202 |
| 2009/0106252 | A1* | 4/2009 | Chopra ................... | H04L 67/02 |
| 2009/0125579 | A1* | 5/2009 | Saillet et al. ................. | 709/203 |
| 2011/0302316 | A1* | 12/2011 | Chou ..................... | H04L 67/02 |
| | | | | 709/228 |
| 2012/0026542 | A1* | 2/2012 | Kobayashi ................... | 358/1.15 |
| 2012/0179825 | A1* | 7/2012 | Dhoolia et al. .............. | 709/226 |
| 2013/0159530 | A1* | 6/2013 | James et al. .................. | 709/226 |
| 2013/0179488 | A1* | 7/2013 | Wang et al. .................. | 709/203 |
| 2014/0032494 | A1* | 1/2014 | Budinsky et al. ............ | 707/624 |

OTHER PUBLICATIONS

M. Nittinggham, ED. ,R.Sayre .ED., "The Atom Syndication Forman". Dec. 2005, Network Working Group 4287, 35 pages.*

* cited by examiner

*Primary Examiner* — Douglas Blair
(74) *Attorney, Agent, or Firm* — Daly, Crowley, Mofford & Durkee, LLP

(57) ABSTRACT

In one aspect, a method includes receiving, at a computer, a request for a resource over an interface from a client, returning the resource from the computer to the client, receiving, at the computer, an action from the client based on the resource returned, returning a unique task instance that includes information about the action, enabling the client to poll the resource periodically and enabling the client to access affected resources. The affected resources include resources affected by the action.

19 Claims, 2 Drawing Sheets

TASK-BASED APPROACH TO EXECUTION, MONITORING AND EXECUTION CONTROL OF ACTIONS

BACKGROUND

A representational state transfer (REST) is a software architecture for distributed systems such as the world wide web (WWW). If the REST software architecture conforms to specified constraints, the architecture is considered to be RESTful.

SUMMARY

In one aspect, a method includes receiving, at a computer, a request for a resource over an interface from a client, returning the resource from the computer to the client, receiving, at the computer, an action from the client based on the resource returned, returning a unique task instance that includes information about the action, enabling the client to poll the resource periodically and enabling the client to access affected resources. The affected resources include resources affected by the action.

In another aspect, an article includes a non-transitory machine-readable medium that stores executable instructions. The instructions cause a machine to receive, from a client, a request for a resource over an interface, return the resource to the client, receive an action from the client based on the resource returned, return a unique task instance that includes information about the action, enable the client to poll the resource periodically and enable the client to access affected resources. The affected resources include resources affected by the action.

In a further aspect, an apparatus includes electronic hardware circuitry. The circuitry is configured to receive, from a client, a request for a resource over an interface, return the resource to the client, receive an action from the client based on the resource returned, return a unique task instance that includes information about the action, enable the client to poll the resource periodically and enable the client to access affected resources. The affected resources include resources affected by the action.

DETAILED DESCRIPTION

In previous implementations of RESTful application program interfaces (APIs), there is no task resource provided that includes consolidated action execution information and uniform resource identifiers (URIs) for action execution control. Instead, clients use custom, ad-hoc approaches for each specific action use-case in order to monitor and control action execution.

Described herein is a mechanism that allows a task-based approach to execution, monitoring and execution control of actions over a RESTful interface. The task resource described herein provides well-defined, convenient and generic way to monitor and control execution of complex operations by RESTful API clients.

As used herein a task resource is the same as a task. A task instance is particular instance of a task when task properties are set to specific values.

In many cases resources which expose RESTful interfaces implement complex operations which affect not only the resource itself but also several related resources. Such resource operations cannot be mapped to one of Hypertext Transfer Protocol (HTTP) commands (e.g., GET, PUT, POST, DELETE and so forth) applicable directly to the resource uniform resource identifier (URI). To support complex operations RESTful API allows defining special purpose actions in the resource representation which are exposed through their own URIs. To execute an action, the client executes POST against an action URI. When an API server receives a request for action execution, the server initiates asynchronous action execution and returns back to the client instance of a task resource with information about action execution status, progress, affected resources, execution errors and set of URIs to control action execution.

A task is a special resource, supported by the API, and it is used to monitor and control execution of actions. A client can periodically request a representation of the task instance to get up-to-date information about action execution status and action execution progress. A task resource includes an URI of the action initiator and has complete information about the action. In addition, task resource provides URIs to retrieve representation of resources affected by the action execution and to retrieve task execution errors. To control action execution, a task resource has action URIs which allows clients to request suspend, abort and resume of action execution. From the RESTful API client prospective, an instance of a task resource returned from request to execute an action encapsulates complete data and control for the duration of action execution.

Figure 1:
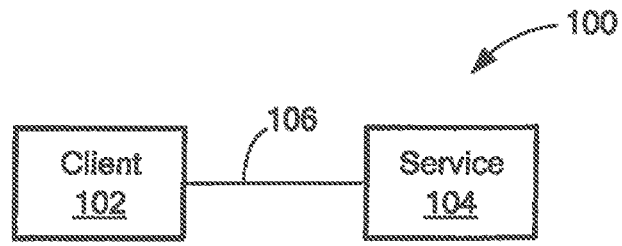
FIG. 1 is a block diagram of an example of a client-service system.

Referring to FIG. 1, a system 100 includes a client 102 and a service 104. The client 102 and the service 104 are coupled together by an interface 106. In one example, the interface 106 is a RESTful interface. As will be described further herein the system 100 is an example of a system used to implement a task.

Figure 2:
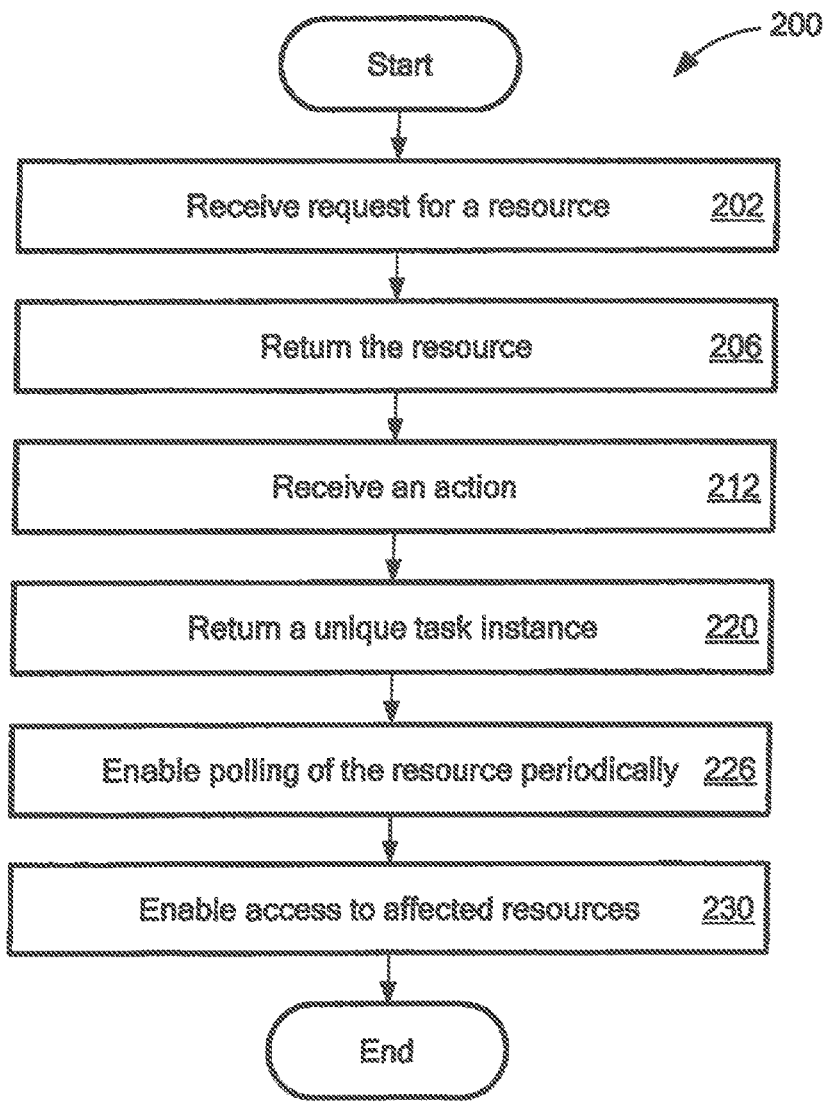
FIG. 2 is a flowchart of an example of a process to use a task.

Referring to FIG. 2, an example of a process to use a task is a process 200. Process 200 receives a request for a resource (202). For example, the client 102 requests a resource from the service 104 identified by the resources' unique uniform resource locator (URL). In one particular example, the client 102 issues a Hypertext Transfer Protocol (HTTP) GET command.

Process 200 returns the resource (206). For example, the resource is returned by the service 104 as an atom (Extensible Markup Language (XML)) representation of the resource that includes links to actions that may be performed on the resource.

Process 200 receives an action (212). For example, a client 102 selects an action to perform on the resource and issues an HTTP Post command to the appropriate action link with a payload appropriate for the action.

Process 200 returns a unique task instance (220). For example, the service 104 returns a unique instance of task represented in an atom (XML) format The task instance includes information about the action being performed. In particular, the task instance includes a URI of the original resource that the action was executed against, a current status of the action, URI links to other resources affected by the action, and a URI to the task.

The task instance also includes a start time, end time, expire time, progress, execution state, initiator type, ID, description and so forth. The ID is a unique identifier for the task instance that distinguishes a task from all other tasks. The description is a brief textual description of the circumstances that caused the task to be generated. The initiator type is a copy of the type of initiator. The start time is the time the processing associated with the task started. The end time is the time associated with the task ends. In some examples, no end time indicates that the task is still in progress. The expire time is the time the task is removed. The execution state is a property that contains a value from an extensible enumeration of possible states that the task may be in. Progress is an optimal representation of percent completion of a task.

Process 200 enables polling of the resource periodically (226). For example, the client 102 can poll the resource periodically to determine if the action has reached a completion state. In other examples, the task instance may expose URIs to abort, suspend and resume the action and the client may make calls to these URIs to influence the action while it is still running.

Process 200 enables access to affected resources (230). In further examples, the task instance allows the client to access affected resources and errors during the execution of the action and after the execution of the action is complete. The affected resources include resources affected by the action that are included in the task instance which includes the original resource that the task was executed against. In other examples, the affected resources may be accessed during and after the action has completed.

Figure 3:
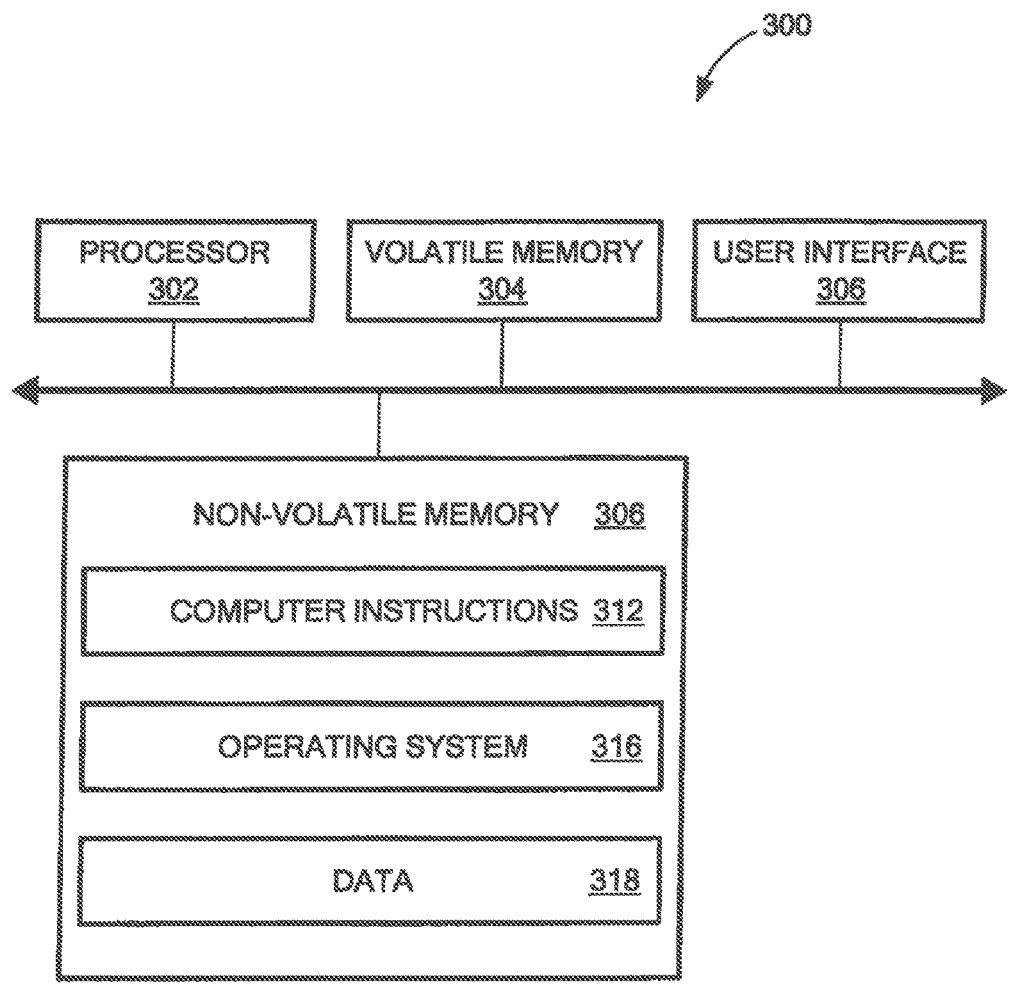
FIG. 3 is a computer on which the process of FIG. 2 may be implemented.

Referring to FIG. 3, in one example, a computer 300 includes a processor 302, a volatile memory 304, a non-volatile memory 306 (e.g., hard disk) and the user interface (UI) 306 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:
1. A method comprising:
receiving, at a computer, a request for a resource over an interface from a client;
returning the resource from the computer to the client in response to receiving the request, the resource being an atom (Extensible Markup Language (XML)) representation comprising links to a plurality of actions that can be performed on the resource;
receiving, at the computer, an action selected from the plurality of actions to be performed on the resource comprising receiving a Hypertext Transfer Protocol (HTTP) POST command to a link of the action with a payload for the action, the action being received from the client;
in response to receiving the action, returning a unique task instance comprising information about the action, returning the unique task instance comprising returning a unique task instance comprising:
a URI (uniform resource identifier) of the resource;
current execution status of the action;
URI links to affected resources that are other resources affected by the action and are included in the task instance; and
a URI to the task instance;

enabling the client to poll the resource periodically after receiving the action; and enabling the client to access the affected resources.

2. The method of claim 1 wherein receiving, from a client, a request for a resource over an interface comprises receiving a unique uniform resource locator (URL) of the resource.

3. The method of claim 1, wherein enabling the client to poll the resource periodically comprises enabling the client to poll the resource periodically to determine if the action has reached a completion state.

4. The method of claim 1, wherein receiving, at a computer, a request for a resource over an interface from a client comprises receiving a request for the resource from a service identified by the unique uniform resource locator (URL) of the resource.

5. The method of claim 1, wherein receiving, at a computer, a request for a resource over an interface from a client comprises receiving a Hypertext Transfer Protocol (HTTP) GET command.

6. The method of claim 1, wherein enabling the client to access the affected resource comprises enabling the client to access errors during execution of the action.

7. An article comprising:
a non-transitory machine-readable medium that stores executable instructions, the instructions causing a machine to:
receive, at a computer, a request for a resource over an interface from a client;
return the resource from the computer to the client in response to receiving the request, the resource being an atom (Extensible Markup Language (XML)) representation comprising links to a plurality of actions that can be performed on the resource;
receive, at the computer, an action selected from the plurality of actions to be performed on the resource comprising receiving a Hypertext Transfer Protocol (HTTP) POST command to a link of the action with a payload for the action, the action being received from the client;
in response to receive the action, returning a unique task instance comprising information about the action, returning the unique task instance comprising returning a unique task instance comprising:
a URI (uniform resource identifier) of the resource;
current execution status of the action;
URI links to affected resources that are other resources affected by the action and are included in the task instance; and
a URI to the task instance;
enable the client to poll the resource periodically after receiving the action; and
enable the client to access the affected resources.

8. The article of claim 7 wherein the instructions causing the machine to receive, from a client, a request for a resource over an interface comprises instructions causing the machine to receive a unique uniform resource locator (URL) of the resource.

9. The article of claim 7, wherein the instructions causing the machine to enable the client to poll the resource periodically comprises instructions causing the machine to enable the client to poll the resource periodically to determine if the action has reached a completion state.

10. The article of claim 7, wherein the instructions causing the machine to receive, at a computer, a request for a resource over an interface from a client comprises instructions causing the machine to receive a request for the resource from a service identified by the unique uniform resource locator (URL) of the resource.

11. The article of claim 7, wherein the instructions causing the machine to receive, at a computer, a request for a resource over an interface from a client comprises instructions causing the machine to receive a Hypertext Transfer Protocol (HTTP) GET command.

12. The article of claim 7, wherein the instructions causing the machine to enable the client to access the affected resource comprises instructions causing the machine to enable the client to access errors during execution of the action.

13. An apparatus, comprising:
electronic hardware circuitry, the circuitry configured to:
receive, at a computer, a request for a resource over an interface from a client;
return the resource from the computer to the client in response to receiving the request, the resource being an atom (Extensible Markup Language (XML)) representation comprising links to a plurality of actions that can be performed on the resource;
receive, at the computer, an action selected from the plurality of actions to be performed on the resource comprising receiving a Hypertext Transfer Protocol (HTTP) POST command to a link of the action with a payload for the action, the action being received from the client;
in response to receive the action, returning a unique task instance comprising information about the action, returning the unique task instance comprising returning a unique task instance comprising:
a URI (uniform resource identifier) of the resource;
current execution status of the action;
URI links to affected resources that are other resources affected by the action and are included in the task instance; and
a URI to the task instance;
enable the client to poll the resource periodically after receiving the action; and
enable the client to access the affected resources.

14. The apparatus of claim 13 wherein the circuitry comprises at least one of a processor, a memory, programmable logic devices and logic gates.

15. The apparatus of claim 13 wherein the circuitry configured to receive, from a client, a request for a resource over an interface comprises instructions circuitry configured to receive a unique uniform resource locator (URL) of the resource.

16. The apparatus of claim 13, wherein the circuitry configured to enable the client to poll the resource periodically comprises circuitry configured to enable the client to poll the resource periodically to determine if the action has reached a completion state.

17. The apparatus of claim 13, wherein the circuitry configured to receive, at a computer, a request for a resource over an interface from a client comprises circuitry configured to receive a request for the resource from a service identified by the unique uniform resource locator (URL) of the resource.

18. The apparatus of claim 13, wherein the circuitry configured to receive, at a computer, a request for a resource over an interface from a client comprises circuitry configured to receive a Hypertext Transfer Protocol (HTTP) GET command.

19. The apparatus of claim 13, wherein the circuitry configured to enable the client to access the affected resource comprises circuitry configured to enable the client to access errors during execution of the action.

* * * * *